(12) United States Patent
Barr

(10) Patent No.: US 12,542,722 B2
(45) Date of Patent: Feb. 3, 2026

(54) AUTOMATED INITIATION OF HELP SESSION IN A VIDEO STREAMING SYSTEM

(71) Applicant: DISH Network L.L.C., Englewood, CO (US)

(72) Inventor: Jeffrey Barr, Chandler, AZ (US)

(73) Assignee: DISH Network L.L.C., Englewood, CO (US)

( * ) Notice: Subject to any disclaimer, the term of this patent is extended or adjusted under 35 U.S.C. 154(b) by 312 days.

(21) Appl. No.: 17/643,878

(22) Filed: Dec. 13, 2021

(65) Prior Publication Data

US 2023/0188436 A1 Jun. 15, 2023

(51) Int. Cl.
*H04L 41/50* (2022.01)
*H04L 9/40* (2022.01)
*H04L 41/5074* (2022.01)

(52) U.S. Cl.
CPC ........ *H04L 41/509* (2013.01); *H04L 41/5074* (2013.01); *H04L 41/5077* (2013.01); *H04L 63/029* (2013.01)

(58) Field of Classification Search
CPC ............... H04L 41/509; H04L 41/5074; H04L 41/5077
USPC ....................................................... 709/224
See application file for complete search history.

(56) References Cited

U.S. PATENT DOCUMENTS

| | | | |
|---|---|---|---|
| 10,349,234 B1 * | 7/2019 | Rivkin | G06Q 20/306 |
| 10,771,523 B1 * | 9/2020 | Carney Landow | H04L 65/1069 |
| 2002/0091832 A1 * | 7/2002 | Low | G06Q 30/02 709/227 |
| 2003/0106067 A1 * | 6/2003 | Hoskins | H04L 69/167 725/111 |
| 2009/0009586 A1 * | 1/2009 | Cassanova | H04N 7/141 348/14.04 |
| 2009/0233542 A1 * | 9/2009 | Gratton | H04N 21/4788 455/3.06 |
| 2016/0073159 A1 * | 3/2016 | Chidambaram | H04N 21/4325 725/132 |
| 2019/0356562 A1 * | 11/2019 | Watkins | H04L 41/5064 |
| 2022/0070133 A1 * | 3/2022 | Santo | H04L 51/043 |

* cited by examiner

*Primary Examiner* — Vivek Srivastava
*Assistant Examiner* — Hien V Doan
(74) *Attorney, Agent, or Firm* — KW Law, LLP

(57) ABSTRACT

Systems, devices and processes are provided to facilitate the delivery of video content in a video streaming system by facilitating the diagnosis and repair of internet gateway devices used in such video streaming systems. Specifically, the various embodiments provide a mechanism by which an end user of video streaming system can initiate the diagnosis and/or repair of the internet gateway device while maintaining the security of the internet gateway device and the video streaming system. More specifically, a help button is provided on the internet gateway device that facilitates the establishment of a secure network session between the internet gateway device and a help center associated with the video streaming system. This secure network session facilitates the diagnosing of operational errors associated with the internet gateway device and thus can facilitate the effective repair and operation of the video streaming system while maintaining device security.

16 Claims, 2 Drawing Sheets

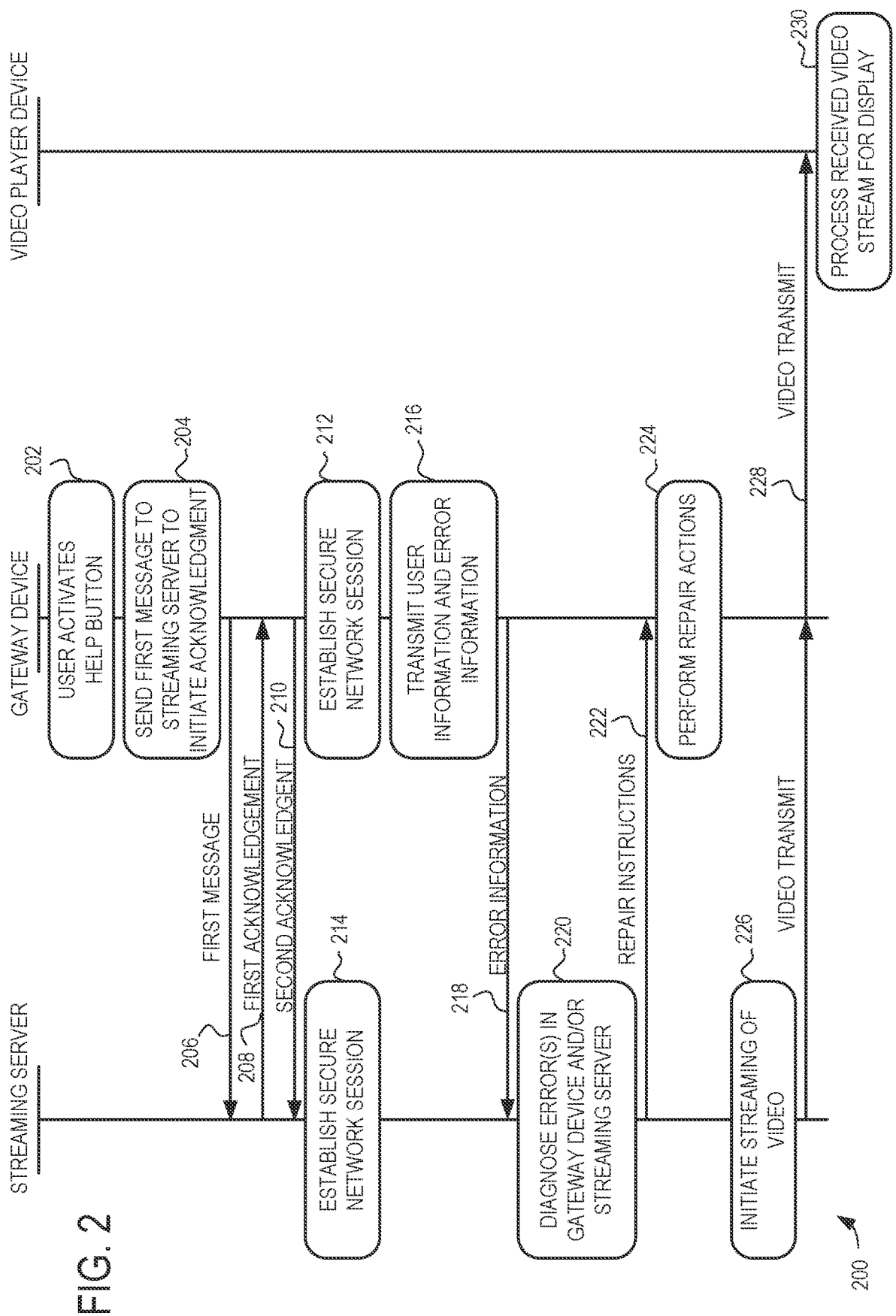

AUTOMATED INITIATION OF HELP SESSION IN A VIDEO STREAMING SYSTEM

TECHNICAL FIELD

Figure 1:
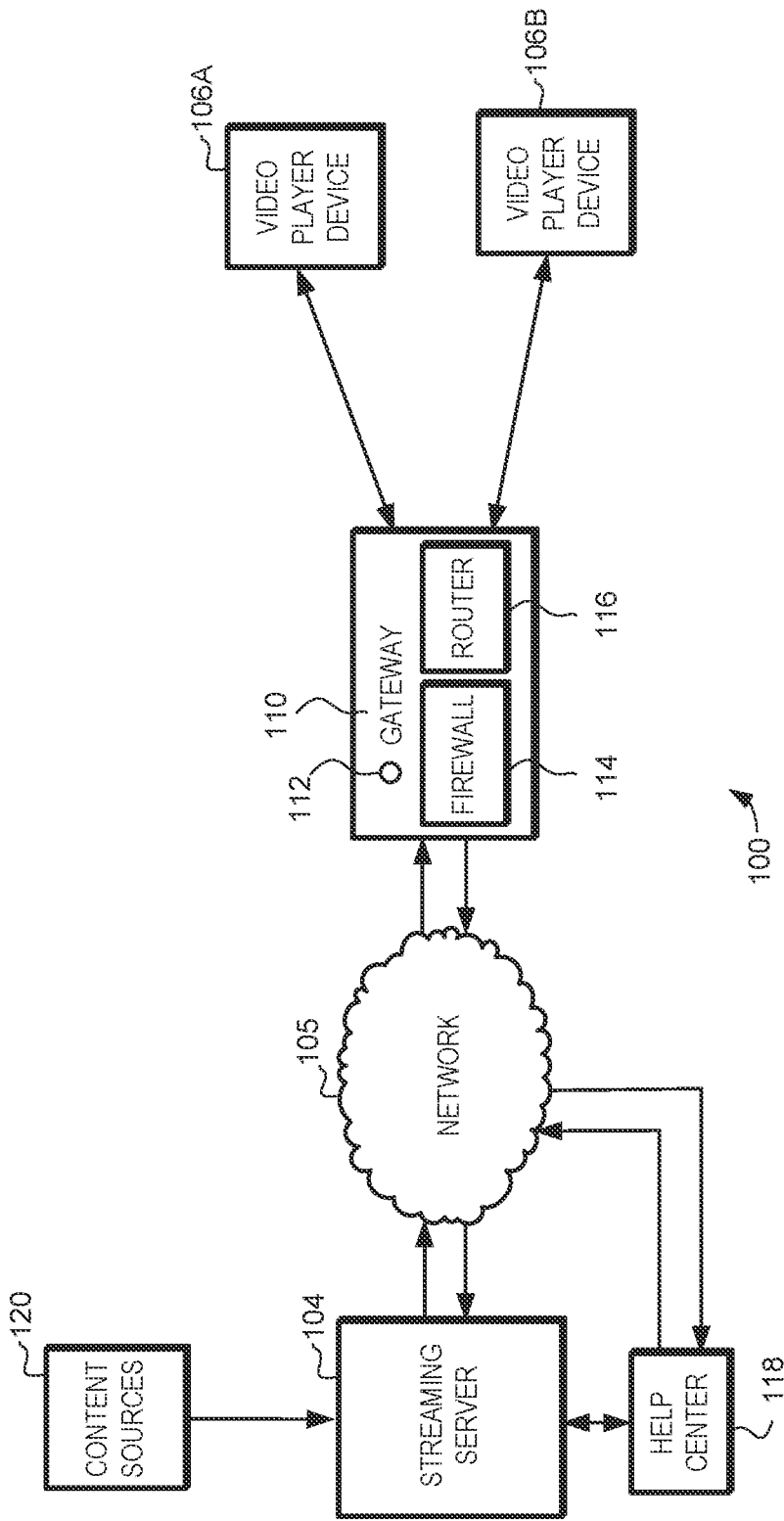

The following discussion generally relates to video streaming systems. More particularly, the following discussion relates to diagnosis and repair in in video streaming systems.

BACKGROUND

Media content, including video-on-demand (VOD) and television (TV) programming, has traditionally been delivered to viewers over legacy cable and satellite broadcast systems. More recently, various streaming video platforms have been introduced by media content providers and gained widespread commercial adoption; the term "media content provider," as appearing herein, encompassing all types of media content sources, aggregators, and the like from which content-containing digital or analog signals can be obtained for viewing on user devices. The term "media content providers" thus encompasses cable, satellite, and over-the-top (OTT) TV providers, as well as entities owning or operating streaming video platforms. It is also now commonplace for end users to placeshift media content stored in memory contained in or accessible to a home media receiver, such as an STB located at the end user's residence, over a network for viewing on a smartphone, tablet, or other portable media receiver operated by the end user.

There is a long standing need to provide effective diagnosis and repair in video streaming systems. One issue that can sometimes hinger the effective diagnosis and repair in a video streaming system is that many internet enabled devices prevent uninvited access from devices outside the local network. This can prevent effective troubleshooting of the internet enabled device in some circumstances. Thus, there remains a continuing desire to provide systems and methods that improve the diagnosis and repair of internet enabled devices in a video streaming system. Other desirable features and characteristics will become apparent from the subsequent detailed description and the appended claims, taken in conjunction with the accompanying drawings and this background section.

BRIEF SUMMARY

The various embodiments described herein provide systems, devices and/or processes to improve the delivery of video content in a video streaming system by facilitating the diagnosis and repair of internet gateway devices used in such video streaming systems. Specifically, the various embodiments provide a mechanism by which an end user of video streaming system can initiate the diagnosis and/or repair of the internet gateway device while maintaining the security of the internet gateway device and the video streaming system. More specifically, the embodiments facilitate the establishment of a secure network session between the internet gateway device and a help center associated with the video streaming system. This secure network session facilitates the diagnosing of operational errors associated with the internet gateway device and thus can facilitate the effective repair and operation of the video streaming system while maintaining device security.

In one embodiment, the internet gateway device is implemented to include a help button that is configured to be selectively activated by a user when certain problems arise in the operation of the video streaming system. During operation an automated processes monitors for the user activation of the help button. Then, responsive to detecting the user activation of the help button, the automated process sends a first message from the internet gateway device to a streaming server. This first message initiates the sending of a first acknowledgement message from the streaming server back to the internet gateway device. Then, responsive to receiving this first acknowledgement message at the internet gateway device, a second acknowledgement message is sent from the internet gateway device to the streaming server. This second acknowledge message establishes a secure network session between the internet gateway device and a help center associated with the streaming server. User information and error information can then be safely sent from the internet gateway device to the help center via the secure network session. Operational errors associated with the internet gateway device can then diagnosed using the user information and the error information that was transmitted via the secure network session. With this diagnosis, possible repair actions can be performed on the internet gateway device as directed by the help center.

Notably, because this diagnosis and repair is done via the secure network session that was initiated at the internet gateway device using the help button, the security of the internet gateway device is maintained. Specifically, the internet gateway device can be configured to reject unsolicited network communication during operation in a way that maintains high levels of device security. Thus, unsolicited requests for communication from other devices across the internet will be ignored and discarded by the internet gateway device to maintain a high level of network security. However, communication with the help center will be allowed because this communication was initiated at the internet gateway device using the help button. Stated another way, because the internet gateway device initiates the creation of the secure network session responsive to user's activation of the help button, the internet gateway device can allow communication with the help center via the secure network session, while continuing to reject other unsolicited requests for network communication.

In one example embodiment an automated process executable by an internet gateway device in communication with a streaming server over a network, where the internet gateway device provides for internet connection between a video player device and the streaming server via the network, and where the internet gateway device includes a help button configured to be activated by a user is provided, the automated process comprising: monitoring for a user activation of the help button on the internet gateway device; responsive to the user activation of the help button, sending a first message from the internet gateway device to the streaming server to initiate a sending of a first acknowledgement message from the streaming server to the internet gateway device; responsive to receiving the first acknowledgement message, send a second acknowledgement message from the internet gateway device to the streaming server to establish a network session between the internet gateway device and a help center associated with the streaming server; transmitting error information from the internet gateway device to the help center via the network session; and diagnosing operational errors associated with the internet gateway device using the error information.

A further example may be implemented wherein the error information includes recent error codes and networking status from the internet gateway device.

A further example may be implemented further comprising transmitting user information from the internet gateway device to the help center via the network session.

A further example may be implemented wherein the diagnosing the operational errors associated with the internet gateway device using the error information further comprises: creating a repair ticket and sending the repair ticket to a repair technician.

A further example may be implemented further comprising maintaining the network session to facilitate communication between the repair technician and the internet gateway device.

A further example may be implemented further comprising repairing diagnosed operational errors associated with the internet gateway device.

A further example may be implemented further comprising closing the network session by closing open ports associated with the network session.

A further example may be implemented further comprising initiate video streaming from the streaming server to the video player device via internet gateway device; and processing received video stream for display.

A further example may be implemented wherein the internet gateway device includes a firewall that utilizes network address translation and an internal router.

A further example may be implemented wherein the internet gateway device is integrated with the video player device in a set-top box.

In another embodiment an automated process executable by an internet gateway device in communication with a streaming server over a network, where the internet gateway device provides for internet connection between a video player device and the streaming server via the network, and where the internet gateway device includes a help button configured to be accessed by a user is provided, the automated process comprising: monitoring for a user activation of the help button on the internet gateway device; responsive to the user activation of the help button, sending a first message from the internet gateway device to the streaming server to initiate a sending of a first acknowledgement message from the streaming server to internet gateway device; responsive to receiving the first acknowledgement message, send a second acknowledgement message from the internet gateway device to the streaming server to establish a secure network session between the internet gateway device and a help center on the streaming server; transmitting user information and error information from the internet gateway device to the help center via the secure network session, the error information including recent error codes and networking status from the internet gateway device; maintaining the secure network session to facilitate communication between a customer service representative and the internet gateway device; diagnosing operational errors associated with the internet gateway device using the user information and the error information; repairing the diagnosed operational errors associated with the internet gateway device; closing the secure network session by closing open ports associated with the secure network session; and initiating video streaming from the streaming server to the video player device via internet gateway device.

In another embodiment an internet gateway device in communication with a video player device and a streaming server over a network, the internet gateway device comprising a processor, a memory, and a help button configured to be accessed by a user, wherein the processor is configured to perform an automated process by executing digital instructions stored in the memory is provided, wherein the automated process comprises: monitoring for a user activation of the help button on the internet gateway device; responsive to the user activation of the help button, sending a first message from the internet gateway device to the streaming server to initiate a sending of a first acknowledgement message from the streaming server to the internet gateway device; responsive to receiving the first acknowledgement message, send a second acknowledgement message from the internet gateway device to the streaming server to establish a network session between the internet gateway device and a help center associated with the streaming server; transmitting error information from the internet gateway device to the help center via the network session; and diagnosing operational errors associated with the internet gateway device using the error information.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

FIG. 1 is a diagram of an example video streaming system that includes a plurality of video player devices and an internet gateway device; and FIG. 2 is a flowchart showing various processes executable by various devices in a streaming media system.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The various embodiments described herein provide systems, devices and/or processes to improve the delivery of video content in a video streaming system by facilitating the diagnosis and repair of internet gateway devices used in such video streaming systems. Specifically, the various embodiments provide a mechanism by which an end user of a video streaming system can initiate the diagnosis and/or repair of the internet gateway device while maintaining the security of the internet gateway device and the video streaming system. More specifically, the embodiments facilitate the establishment of a secure network session between the internet gateway device and a help center associated with the video streaming system. This secure network session facilitates the diagnosing of operational errors associated with the internet gateway device and thus can facilitate the effective repair and operation of the video streaming system while maintaining device security.

In one embodiment, the internet gateway device is implemented to include a help button that is configured to be selectively activated by a user when the user desires assistance in identifying and repairing problems with the video streaming system. During operation of the internet gateway device an automated processes monitors for the user activation of the help button. Then, responsive to detecting the user activation of the help button, the automated process sends a first message from the internet gateway device to a streaming server. This first message initiates the sending of a first acknowledgement message from the streaming server back to the internet gateway device. Then, responsive to receiving this first acknowledgement message at the internet gateway device, a second acknowledgement message is sent from the internet gateway device to the streaming server. This message exchange establishes a secure network session between the internet gateway device and a help center associated with the streaming server. User information and error information can then be safely sent from the internet gateway device to the help center via the secure network session. Operational errors associated with the internet gateway device can then diagnosed using the user information and the error information that was transmitted via the secure network session. With this diagnosis, possible repair actions can be performed on the internet gateway device as directed by the help center.

Notably, because this diagnosis and repair is done via the secure network session that was initiated at the internet gateway device using the help button, the security of the internet gateway device is maintained. Specifically, the internet gateway device can be configured to reject unsolicited network communication during operation in a way that maintains high levels of device security. Thus, unsolicited requests for communication from other devices across the internet will be ignored and discarded by the internet gateway device to maintain a high level of network security. However, communication with the help center will be allowed because this communication was initiated at the internet gateway device responsive to the user activating the help button. Stated another way, because the internet gateway device initiates the creation of the secure network session responsive to user's activation of the help button, the internet gateway device can allow communication with the help center via the secure network session, while continuing to reject other unsolicited requests for network communication.

Turning now to the drawings and with initial reference to FIG. 1, a video streaming system 100 suitably includes a streaming server 104, an internet gateway device 110, and a plurality of video player devices 106A-b. In general, the streaming server 104 receives video content from one or more content sources 120, and transmits that video content through the network 105 and internet gateway device 110 to the video player devices 106A-b in the form of a video stream that can be received, processed, and displayed at the video player devices 106A-B.

In general, the content sources 120 can be any type of video content source, including media providers, content aggregators or distributors such as a cable television system operator, a direct broadcast satellite (DBS) system operator, or simply a network service provider or the like. These content sources 120 can provide the video content to the streaming server 104 in any suitable form and by any suitable technique. For example, the video content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the video player devices 106A-B. For example, the streaming server 104 can transmit an encoded video stream via a content delivery network (CDN) for distribution on network 105 (e.g., the Internet) as part of an RSDVR, VOD or other video streaming service. The video streams are thus transmitted to the video player devices 106A-B via the internet gateway device 110.

In general, the streaming server 104 includes the combination of hardware and software to process received content into a suitable format and stream the content to the video player devices 106A-B. To facilitate this, the streaming server 104 can include at least an I/O, a processor, and a memory, content manager and encoder. In this embodiment the content manager is provided to manage and distribute electronic program guide (EPG) data and other information about the programs that are distributed within streaming system 100. In this embodiment the encoder operates to encode live broadcast signals and other such video content for adaptive streaming on the network 105. In one specific example, the encoder suitably encodes programs contained within signals from the content sources into one or more adaptive streams that each representing a media program in its entirety, but with different bit rates, frame rates, resolution and/or other levels of quality. This allows a client video player device 106A-B to mix and match segments from different streams to create a media stream that effectively adapts as network conditions or other conditions change.

In general, each of the video player devices 106A-B includes a combination of hardware and/or software needed to receive, process, and play the video streams received from the streaming server 104. As examples, each of the video player devices 106A-B can be implemented to include a streaming application stored in memory and being executed by a suitable processor. As some specific examples, each of the video player devices 106A-B can be implemented with any suitable computing device, including laptops, tablets, virtual reality (VR) devices, and mobile communication devices (e.g., smart phones). Such devices may include an integrated display screen, or may be coupled to a separate display screen.

As one specific example, each video player device 106A-B can include an I/O, a processor, a memory, and a display device. Furthermore, each video player device 106A-B can include a streaming application and a device OS residing in memory and being executed by the processor. As some specific examples, each video player device 106A-B can be implemented with any suitable computing device, including laptops, tablets and mobile communication devices (e.g., smart phones). Such devices may include integrated display device, or may be coupled to a separate display device. And as will be described below, in some embodiments one or more of the video player devices 106A-B can be integrated with the internet gateway device 110. For example, the video player device 106A can be integrated with the internet gateway device 110 as part of a set-top box that includes other features such as a user interface and digital video recorder (DVR).

In general, the internet gateway device 110 serves as a link between the network 105 and the video player devices 106A-B by providing both data routing and security functions. To facilitate this, the internet gateway device 110 can include a combination of hardware and software to provide data routing and security functions, including input/output ports, processors and memory. And in accordance with the embodiments described herein, the internet gateway device 110 includes a help button 112.

In the embodiment illustrated in FIG. 1, the internet gateway device 110 includes a firewall 114 and a router 116. In general, the router 116 is configured and implemented to route data packets between the network 105 and the video player devices 106A-B. To perform this routing function the router 116 can include a variety of devices implemented to perform a variety of functions. For example, router 116 can include one or more network interface controllers that facilitate TCP/IP packet routing to receive and forward data packets to specific devices, including the video player devices 106A-B.

To facilitate the routing functionality the internet gateway device 110 can also include various network interface ports. For example, the internet gateway device 110 can include Fast Ethernet or Gigabit Ethernet ports for coupling to the video player devices 106A-B via suitable Ethernet cables. The internet gateway device 110 can also include one or more Universal Standard Bus (USB) ports. The internet gateway device 110 can also include one or more Multimedia over Coax Alliance (MoCA) ports. As another example, the internet gateway device 110 can include wireless network interface controllers such as IEEE 802.11 compatible Wi-Fi® devices and/or a Bluetooth® compatible devices to wirelessly connect to the video player devices 106A-B.

In some implementations the internet gateway device 110 can include a modem (e.g., a cable modem or digital subscriber line (DSL) modem) that uses modulation and demodulation to connect to the network 105. However, in other embodiments the modem can be implemented as a separate device.

To improve security the internet gateway device 110 includes a firewall 114. In general, the firewall 114 can be implemented to monitor and control incoming data packets from the network 105 based on specific security rules. As examples, the firewall 114 can be implemented to provide data packet filtering based on source and destination IP address, source ports, and destination ports. For example, the transmission control protocol/internet protocol (TCP/IP) allows firewalls to distinguish between types of internet traffic, such as general browsing, file transfer, and media streaming.

As one specific example, the firewall 114 can be implemented to use network address translation (NAT) to increase the security provided to the router 116 and to connected devices such as video player devices 106A-B. In general, NAT is a method of mapping address spaces by modifying address information in the header of data packets before they are passed to the other devices. This allows the internet gateway device 110 to provide one public internet-routable address to systems connected through the network 105, allowing internal addresses, including internal addresses of the internet gateway device 110 and video player devices 106A-B, to remain private.

The use of NAT can increase the security of the internet gateway device 110, router 116 and video player devices 106A-B. Specifically, by keeping internal addresses private from outside devices the security of the router 116 and video player devices 106A-B is increased. Furthermore, the firewall 114 can use NAT to restrict connections initiated from external devices (e.g., devices connected through the network 105). In such an implementation the firewall 114 will only allow communication if the internet gateway device 110 (e.g., router 116) or a device on the private network (e.g., video player devices 106A-B) requested it. Any unsolicited requests or data packets from outside the private network are discarded. Preventing connections initiated from external devices can prevent communication with potentially dangerous devices on the internet.

Unfortunately, the use of NAT and such a firewall 114 can also prevent remote diagnosis and repair of problems with the internet gateway device 110 or video player devices 106A-B. Specifically, because the firewall 114 prevents connections that are initiated from outside the private network some remote diagnosis and repair procedures will also be prevented. However, the embodiments described herein provide a help button 112 on the internet gateway device 110 that is configured to be selectively activated by a user when problems arise in the operation of the video streaming system 100. During operation an automated processes monitors for the user activation of the help button 112. When such a user activation of the help button 112 is detected a first message is sent internet gateway device 110 that initiates a connection with a help center 118 associated with streaming server 104. Because such a connection is initiated at the internet gateway device 110, the connection with the help center 118 will not be prevented by the firewall 114 or other NAT security measures. This process will be described in greater detail down below.

The help button 112 can be implemented with any suitable type of user interface device. For example, the help button 112 can be implemented with mechanical switches, capacitive sensing, resistive sensing, etc. In any of these embodiments the user activation of the help button 112 initiates a secure connection with the help center 118 associated with the streaming server 104.

Specifically, during operation of the internet gateway device 110 an automated processes monitors for the user activation of the help button 112. Then, responsive to detecting the user activation of the help button 112, the automated process sends a first message from the internet gateway device 110 to a streaming server 104. This first message initiates the sending of a first acknowledgement message from the streaming server 104 back to the internet gateway device 110. Notably, because the first message was sent by the internet gateway device 110 the firewall 114 will allow the first acknowledgement message to be delivered at the internet gateway device 110. Then, responsive to receiving this first acknowledgement message at the internet gateway device 110, a second acknowledgement message is sent from the internet gateway device 110 to the streaming server 104.

This message exchange establishes a secure network session between the internet gateway device 110 and a help center 118 associated with the streaming server 104. User information and error information can then be safely sent from the internet gateway device 110 to the help center 118 via the secure network session. The help center 118 can also obtain additional information from the streaming server or other associated systems. Operational errors associated with the internet gateway device 110 can then diagnosed using the user information and the error information that was transmitted via the secure network session. With this diagnosis, possible repair actions can be performed on the internet gateway device 110 as directed by the help center 118.

As described above, the help center 118 is associated with the streaming server 104 and is configured to diagnosis and/or repair errors associated with the internet gateway device 110. To achieve this, the help center 118 can be implemented to use any suitable diagnostic and repair technique. For example, the help center 118 can be implemented to use machine learning or neural networks in diagnosing errors based on the user information and error information provided. In other embodiments the help center 118 can provide an interface for human technicians to assist with the diagnosis and repair of errors.

The help center 118 can also provide a mechanism for interfacing directly with the internet gateway device 110 to effectuate repairs on the system using any suitable technique. For example, the help center 118 can be configured to allow a technician to change operational parameters at the internet gateway device 110, upload software updates, etc.

It should be noted that the internet gateway device 110 can be implemented in many different ways and in many different devices. For example, the internet gateway device 110 can be implemented as a stand-alone routing device, with or without a modem for connecting directly to an internet service provider. In other embodiments the internet gateway device 110 can be integrated with a video player device. For example, the internet gateway device 110 can be integrated into a set-top box that also performs video processing and can connect directly to a television or other monitor for video display. In those embodiments the set-top box can include other associated devices, including video output ports (e.g., MoCA and/or HDMI ports), DVRs, user interfaces, and remote control devices.

Turning now to FIG. 2, a process flow diagram 200 illustrates various example processes and data flows that can be automatically executed by an internet gateway device (e.g., internet gateway device no) in a video streaming system (e.g., video streaming system 100) that includes a streaming server (e.g., streaming server 104) and one or more video player devices (e.g., video player devices 106A-B). Specifically, the process flow diagram 200 illustrates a process flow between an exemplary internet gateway device, streaming server and an exemplary video player device that provides for the establishment of network session for diagnosis and repair of errors associated with the internet gateway device.

To facilitate the process flow, communications between the various devices can be initiated and established in any suitable manner. For example, communication between the various devices and networks may be established using Internet or other protocols that can include both wireless networking systems (e.g., Wi-Fi) or wired networking systems (e.g., Ethernet, MoCA or HDMI).

At process step 202, the gateway device monitors for activation of the help button and at process step 204 the gateway device sends a first message 206 to the streaming server responsive to the activation of the help button. These process steps can be implemented in a variety of ways. For example, the help button can be implemented to set a flag or register on the internet gateway device, that when set, initiates a software process that sends the first message 206 to the streaming server.

When received at the streaming server, the first message 206 initiates the sending of a first acknowledgement message 208 back to the internet gateway device. Then, responsive to receiving this first acknowledgement message 208 at the internet gateway device, a second acknowledgement message 210 is sent from the internet gateway device to the streaming server. The result of the exchange of messages 206, 208 and 210 is the establishment of a network session between the internet gateway device and a help center associated with the streaming server at process steps 212 and 214. For example, the three messages 206, 208 and 210 can be implemented to perform a TCP three-way handshake that establishes a TCP connection between the internet gateway device and the help center. In some embodiments, the TCP connection can utilize secure communication techniques, such as transport layer security (TLS) or secure sockets layer (SSL) protocols. Of course, these are just some examples of the types of network sessions that can be created using the messages initiated by the user activation of the help button.

With the network session established at process steps 212 and 214, user information and error information 218 can then be sent from the internet gateway device to the help center via at process step 216. This user information and error information 218 can include any type of information that may be useful in diagnosing errors in the internet gateway device or in the operation of the streaming system in general. For example, this information can include error codes, networking status information, streaming statistics, user identification data, device identification data, etc. It should also be noted that the help center can also obtain information directly from the streaming server or through other associated systems.

Operational errors associated with the internet gateway device and/or the streaming server can then be diagnosed at process step 220 using the user information and the error information 218 that was transmitted via the network session. This diagnosis of operational errors can be performed using any suitable diagnostic technique. In some embodiments this diagnosis can be performed by an automated diagnostic system that uses machine learning or other techniques to diagnosis errors in the system. In other embodiments the information can be passed to a technician associated with the help center that assists in the diagnosis of errors in the system. For example, a repair ticket with this information can be created and sent to a technician associated with the help center. In this embodiment the information in the repair ticket may include user contact data that allows the help center technician to contact the user of the internet gateway device to assist with the repair.

With a diagnosis made repair instructions 222 can be sent from the help center to the internet gateway device. Then, at process step 224 the instructed repair actions can be performed.

In some embodiments the repair instructions 222 are sent directly from an automated help center. In other embodiments, the repair instructions 222 are sent at the direction of a technician working with the help center. Specifically, in some embodiments the help center may include a remote session capability or other ability to interface directly with the internet gateway device. This can allow the help center or a technician associated with the help center to effectuate repairs on the internet gateway device using any suitable technique. For example, the remote session ability may allow the technician to change operational parameters at the internet gateway device 110, upload software updates, change firmware etc. In other embodiments the technician can direct the end user to effectuate these changes directly on gateway device.

In some embodiments an internet-based communication link between the repair technician and the user can be established maintained to assist in the repair. For example, an internet-based chat session between the user and the technician can be created with contact information provided by the internet gateway device. This internet-based chat can be facilitated through the network session created between the internet gateway device and the help center, or in other ways. In other embodiments, contact information provided can allow the technician to make a phone call to discuss the repair with the user.

With the repairs made the network session between the internet gateway device and the help center can be closed.

For example, the network session can be closed by closing open ports on the internet gateway device that are associated with the network session.

With the repairs made the streaming system can again begin streaming video to video player devices through the internet gateway device. Thus, at process step 226 the streaming server initiates a streaming video session and begins transmitting a video stream of a program channel to the video player device using video transmit function 228. In a typical embodiment the streaming server initiates the streaming video session at the direction of a user operating the video player device. For example, a streaming application on the video player device can communicate with the streaming server via the internet gateway device and provide a user interface for initiating a streaming video session of the program channel. Process step 226 and video transmit function 228 can include the encoding and transmitting of the selected program channel from any suitable content source. Additionally, such processing and transmitting can include transmitting using any suitable technique or protocol. As one detailed example, the streaming server can transmit an encoded video stream via a content delivery network for distribution the Internet as part of an RSDVR, VOD or other video streaming service. In these and other such embodiments these videos streams are thus received at the video player devices as input video streams.

At process step 230, the video player device processes the received input video streams of the program channel for display on the video player device. In this process step a streaming application and/or operating system and/or specialized hardware on the video player device performs typical video processing tasks associated with the receiving and displaying of video. For example, these elements can perform various decoding and rendering functions as needed to display the program channel on a video display device.

Thus, the process flow illustrated in FIG. 2 can facilitate the repair of errors in a streaming video system and facilitate the streaming of video content to one or more video player devices.

The embodiments described herein thus facilitate the diagnosis and repair of internet gateway devices used in such video streaming systems. Specifically, the various embodiments provide a mechanism by which an end user of video streaming system can initiate the diagnosis and/or repair of the internet gateway device while maintaining the security of the internet gateway device and the video streaming system. More specifically, a help button is provided on the internet gateway device that facilitates the establishment of a secure network session between the internet gateway device and a help center associated with the video streaming system. This secure network session facilitates the diagnosing of operational errors associated with the internet gateway device and thus can facilitate the effective repair and operation of the video streaming system while maintaining device security.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by an internet gateway device in communication with a streaming server over a network, wherein the internet gateway device provides for internet connection between a video player device and the streaming server via the network, and where the internet gateway device includes a physical help button on the internet gateway device, the automated process comprising:
    monitoring for an activation of the physical help button disposed on the internet gateway device comprising a firewall, wherein the internet gateway device is not a set-top box, wherein the activation of the physical help button on the internet gateway device automatically causes the internet gateway device to initiate a connection with a help center;
    responsive to the activation of the physical help button, sending a first message from the internet gateway device through the firewall to the streaming server to initiate a sending of a first acknowledgement message from the streaming server to the internet gateway device;
    responsive to receiving the first acknowledgement message, sending a second acknowledgement message from the internet gateway device to the streaming server to establish a TCP connection through the firewall and between the internet gateway device and the help center associated with the streaming server, wherein the firewall of the internet gateway device implements network address translation (NAT) to reject unsolicited network communications with the video player device, wherein the firewall allows the TCP connection and avoids the NAT in response to the first message originating from the internet gateway device;
    transmitting error information from the internet gateway device to the help center via the TCP connection; and
    changing, by the internet gateway device and in response to a command from the help center, an operational parameter of the internet gateway device to repair operational errors diagnosed by the help center using the error information, wherein changing the operational parameter further comprises creating a repair ticket and sending the repair ticket to a repair technician.

2. The automated process of claim 1, wherein the error information includes recent error codes and networking status from the internet gateway device.

3. The automated process of claim 1, further comprising transmitting user information from the internet gateway device to the help center via the TCP connection.

4. The automated process of claim 1, further comprising maintaining the TCP connection to facilitate communication between the repair technician and the internet gateway device.

5. The automated process of claim 1, further comprising:
    repairing diagnosed operational errors associated with the internet gateway device.

6. The automated process of claim 1, further comprising:
    closing the TCP connection by closing open ports associated with the TCP connection.

7. The automated process of claim 1, further comprising:
initiating video streaming from the streaming server to the video player device via the internet gateway device; and
processing received video stream for display.

8. The automated process of claim 1, wherein the firewall utilizes an internal router.

9. An internet gateway device in communication with a video player device and a streaming server over a network, the internet gateway device comprising a processor, a memory, and a physical help button on the internet gateway device, wherein the processor is configured to perform an automated process by executing digital instructions stored in the memory, wherein the automated process comprises:
detecting an activation of the physical help button on the internet gateway device, wherein the internet gateway device comprises a modem that communicates on an Internet, comprises a router that communicates with the video player device and the modem, and comprises a firewall that restricts communication between the video player device and the Internet,
wherein the activation of the physical help button on the internet gateway device automatically causes the internet gateway device to initiate a connection with a help center;
sending a first message originating from the internet gateway device, through the firewall, and to the streaming server to initiate a sending of a first acknowledgement message from the streaming server to the internet gateway device;
responsive to receiving the first acknowledgement message, sending a second acknowledgement message from the internet gateway device to the streaming server to establish the connection through the firewall between the internet gateway device and the help center associated with the streaming server, wherein the firewall allows the connection in response to the sending the first message from the internet gateway device;
transmitting error information from the internet gateway device to the help center via the connection; and
changing, by the internet gateway device and in response to a command from the help center, an operational parameter of the internet gateway device to repair operational errors diagnosed by the help center using the error information, wherein changing the operational parameter further comprises creating a repair ticket and sending the repair ticket to a technician.

10. The internet gateway device of claim 9, wherein the error information includes recent error codes and networking status from the internet gateway device.

11. The internet gateway device of claim 9, wherein the automated process further comprises transmitting user information from the internet gateway device to the help center via the connection.

12. The internet gateway device of claim 9, wherein the automated process further comprises repairing diagnosed operational errors associated with the internet gateway device.

13. The internet gateway device of claim 9, wherein the automated process further comprises closing the connection by closing open ports associated with the connection.

14. The internet gateway device of claim 9, wherein the automated process further comprises:
initiating video streaming from the streaming server to the video player device via the internet gateway device; and
processing received video stream for display.

15. The internet gateway device of claim 9, wherein the firewall utilizes network address translation (NAT).

16. The internet gateway device of claim 9, wherein the video player device comprises a set-top box.

* * * * *